United States Patent
Blackmore et al.

(10) Patent No.: US 8,398,139 B2
(45) Date of Patent: Mar. 19, 2013

(54) FRONT PASSENGER SMALL STORAGE PRESENTER

(75) Inventors: Kathleen Blackmore, Northville, MI (US); Anthony Ligi, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/212,660

(22) Filed: Aug. 18, 2011

(65) Prior Publication Data

US 2013/0043698 A1 Feb. 21, 2013

(51) Int. Cl.
*B60R 7/06* (2006.01)
(52) U.S. Cl. ............... 296/37.12; 312/274; 312/330.1
(58) Field of Classification Search ............ 296/37.1, 296/37.8, 37.9, 37.12; 312/273, 274, 330.1
See application file for complete search history.

(56) References Cited

U.S. PATENT DOCUMENTS

| | | | | |
|---|---|---|---|---|
| 302,469 | A * | 7/1884 | Cook | 211/83 |
| 2,552,898 | A * | 5/1951 | Lenci et al. | 296/37.1 |
| 2,805,910 | A * | 9/1957 | Townsend | 312/273 |
| 2,814,545 | A * | 11/1957 | Cornish | 312/271 |
| 2,872,267 | A * | 2/1959 | Machingo et al. | 312/273 |
| 4,050,581 | A * | 9/1977 | Sedlacek | 206/544 |
| 4,639,145 | A * | 1/1987 | Lautenschlager | 384/19 |
| 5,940,502 | A | 8/1999 | Hirai et al. | |
| 7,127,332 | B2 | 10/2006 | Strohmeier et al. | |
| 7,246,848 | B2 * | 7/2007 | Kawamura et al. | 296/213 |
| 7,708,328 | B2 | 5/2010 | Doom et al. | |
| 2008/0048467 | A1 | 2/2008 | Vorberg | |

FOREIGN PATENT DOCUMENTS

| | | |
|---|---|---|
| JP | 2005-104350 | 4/2005 |
| WO | 2005-042311 A1 | 5/2005 |

OTHER PUBLICATIONS http://www.londonwest.citroen.co.us/parts-and-accessories/accessory-selector/Dashboard-Storage-Drawer-C2-C3-C3-Pluriel-1014/?showImage=true 2 page website prinout from Citroen May 5, 2011.

* cited by examiner

*Primary Examiner* — Dennis Pedder
(74) *Attorney, Agent, or Firm* — Vichit Chea; Price Heneveld LLP

(57) ABSTRACT

A storage compartment or presenter includes a tray that is ejected from a vehicle panel when a door on the storage presenter is fully opened and recessed into a storage housing. In this way, the present invention presents objects stored in the storage compartment to a driver or passenger by deploying a storage tray allowing access to items stored therein. Thus, the present invention eliminates the difficulty in retrieving objects within the often times small confines available for in-panel storage compartments.

9 Claims, 6 Drawing Sheets

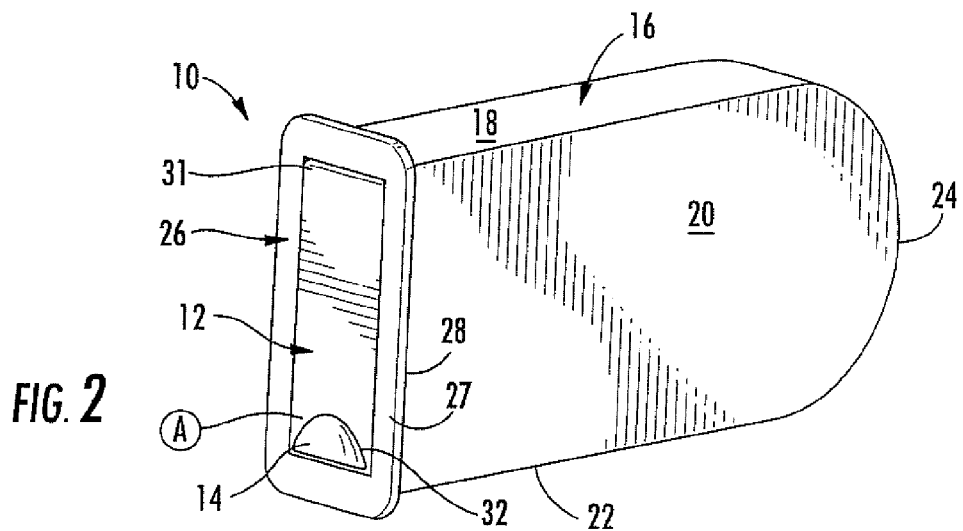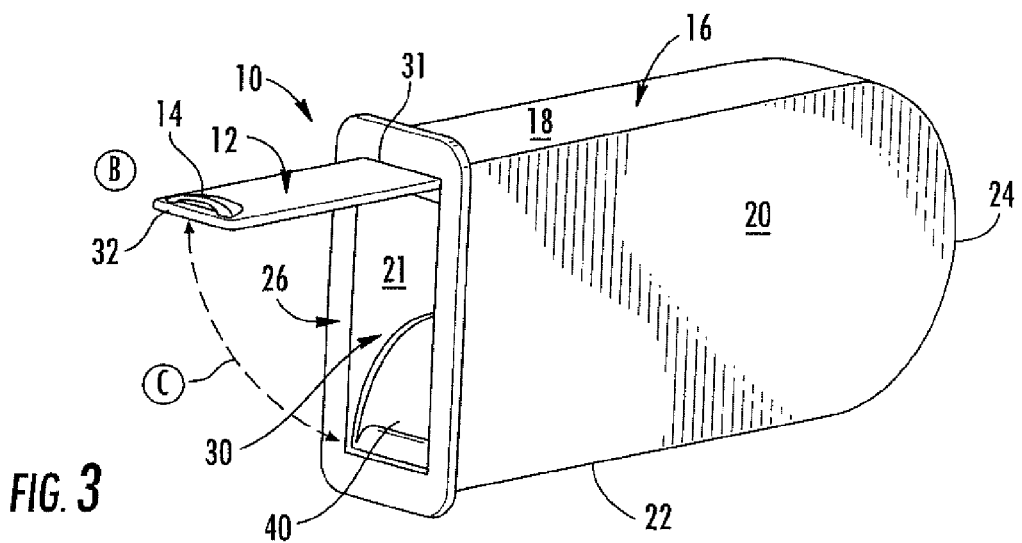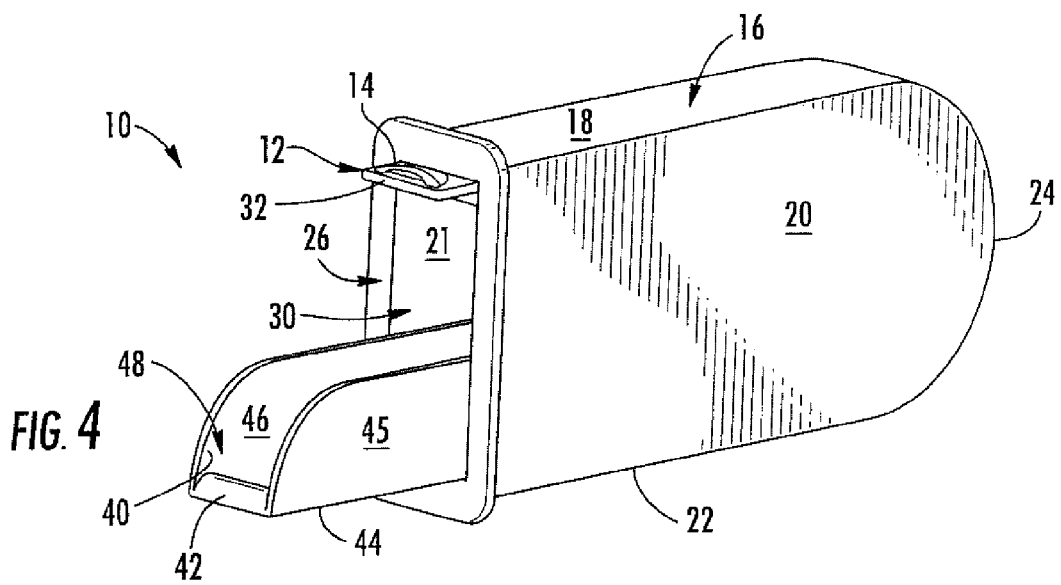

FRONT PASSENGER SMALL STORAGE PRESENTER

FIELD OF THE INVENTION

The present invention generally relates to a storage compartment for use within a vehicle instrument panel, and, more particularly, to a vehicle storage presenter.

BACKGROUND OF THE INVENTION

Small storage compartments often exist within a vehicle interior in the cockpit area and are often times generally disposed on the vehicle instrument panel. In accessing these small storage compartments, it is difficult to retrieve the objects stored therein due to lack of accessibility given the confines of the storage compartments and the limited space found on the vehicle instrument panel.

The present invention provides a vehicle storage compartment that includes a tray that is ejected from the vehicle panel when a door on the storage compartment is fully opened and recessed into a storage housing. In this way, the present invention presents objects stored in the storage compartment to a driver or passenger outside of a storage housing. Thus, the present invention eliminates the difficulty in retrieving objects within the small confines available for in-panel storage compartments.

SUMMARY OF THE INVENTION

One aspect of the present invention includes a vehicle panel storage compartment or presenter comprising a housing, a storage tray and a door. The storage tray is slideably moveable between a stowed position and a deployed position relative to the housing. The door is slideably moveable between a stowed position and a deployed position relative to the housing and is further pivotably moveable relative to the housing. A flexible connector is disposed within the housing and operably couples to the door at a first end and operably couples to the tray at a second end. The storage tray and door are inversely slideable between stowed and deployed positions relative to the housing, such that as the door is stowed, the storage tray is deployed and vice versa.

Another aspect of the present invention includes a vehicle panel storage compartment or presenter comprising a housing which includes a cavity with a guide channel disposed therein. A storage tray is operable between stowed and deployed positions such that the tray is substantially enclosed within the cavity of the housing in the stowed position. A door is slideably moveable relative to the housing between stowed and deployed positions. A flexible connector is disposed within the guide channel and operably couples the door to the tray. The door further actuates the deployment of the tray simultaneously as the door is stowed.

Yet another aspect of the present invention includes a vehicle panel storage compartment or presenter comprising a flexible connector slideably movable relative to a housing and having a first end and a second end. A door is operably coupled to the connector at the first end of the connector and a storage tray is operably coupled to the connector at the second end. The storage tray and the door are slideably moveable relative to the housing in an inverse relationship, such that as the door is stowed, the storage tray is deployed and vice versa.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 2 is a perspective view of the storage presenter in the closed position;

FIG. 3 is a perspective view of the storage presenter in an open position;

FIG. 4 is a perspective view of the storage presenter in an open position;

DETAILED DESCRIPTION OF PREFERRED EMBODIMENTS

Figure 1:
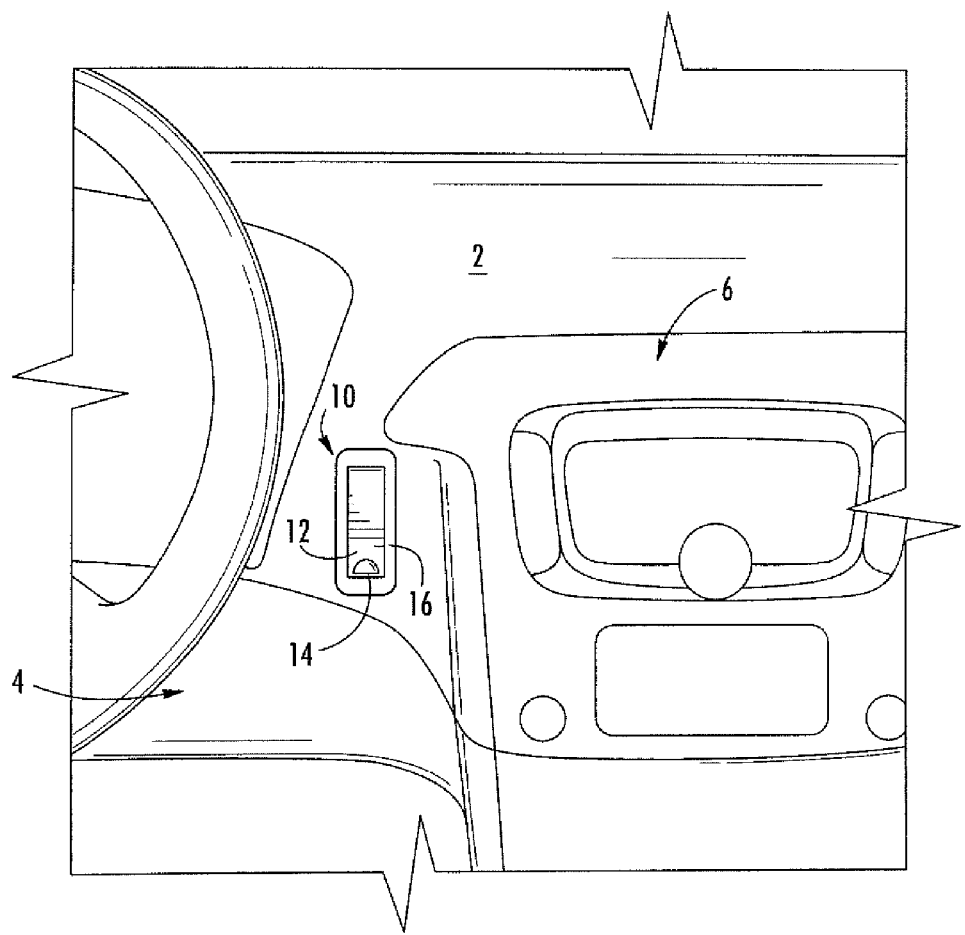
FIG. 1 is a perspective view of a storage presenter as found in a vehicle instrument panel according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring to FIG. 1, the reference numeral 10 generally designates a storage presenter of the present invention disposed in a vehicle instrument panel or dashboard 2 as found in a vehicle passenger compartment 4. The vehicle instrument panel 2 has a central section 6 and the storage presenter 10 is disposed to the left of the central panel section 6 on the vehicle instrument panel 2. In this embodiment, the storage presenter 10 is shown as a vertical storage presenter and further includes an access door 12 having an elevated tab 14.

The access door 12 pivots relative to a storage presenter housing 16 as further described below. Referring to FIGS. 2-4, the storage presenter 10 is shown removed from, the vehicle instrument panel 2, as shown in FIG. 1. The housing 16 comprises a top wall 18, first and second side walls 20 and 21 and a bottom wall 22. Housing 16 further comprises a rear wall 24 and a front lip or rim 26. As shown in FIGS. 2-4, the housing 16 is assembled such that first and second sidewalls 20 and 21 are laterally disposed in a spaced-apart relationship with top wall 18, bottom wall 22 and rear wall 24 connecting the first and second side walls 20 and 21 to form a cavity 30. In the embodiment shown in FIGS. 2-4, the housing 16 is assembled in a generally U-shaped configuration having a curved rear portion along rear wall 24.

The front rim 26, as shown in FIG. 2, comprises a front wall 27 and a rear wall 28, wherein the rear wall 28 is configured to abut a vehicle instrument panel 2, as shown in FIG. 1, in assembly. As shown in FIG. 2, the front rim 26 of the housing 16 circumvents the access door 12 completely. The access door 12 has an upper portion 31 and a lower portion 32. As shown in FIG. 2, the access door 12 is in a closed position A. The access door is pivotable between the closed position A (FIG. 2) and an open position B (as indicated by arrow C in FIG. 3). The access door 12 pivots with respect to the housing 16 at a pivot point disposed near the upper portion 31 of the access door 12. Tab 14 disposed on the lower portion 32 of the access door 12 provides an engagement point for the user to engage and pivot the access door 12 from the closed position A to the open position B, thereby exposing storage cavity 30. The access door 12 is slideably movable relative to the housing 16, as further described below.

As shown in FIG. 3, a storage tray 40 is shown in a stowed position, wherein the storage tray is substantially enclosed within the cavity 30 of the housing 16. As shown in FIG. 4, the storage tray 40 is slideably movable relative to the housing 16 and is shown here in a deployed position. The storage tray 40 is moved to the deployed position, as shown in FIG. 4, when the access door 12 is slideably pushed into the housing 16 by the user as further described below. The storage tray 40 comprises a front lip 42, a bottom wall 44, and side walls 45, 46. Together, the front lip 42, bottom wall 44, and side walls 45, 46 make up a storage cavity 48 wherein a user of the storage presenter 10 can store an item for retrieval.

Figure 5A:
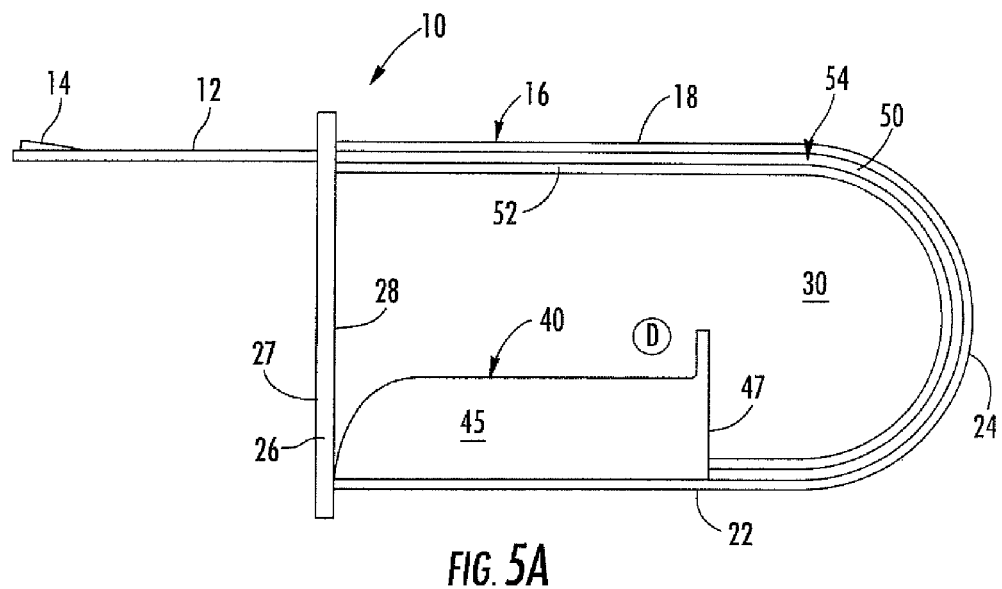
FIG. 5A is a side elevational view of the storage presenter in an open position.

Referring now to the embodiment shown in FIG. 5A, the vehicle storage presenter 10 is shown with side walls 20, 21 (shown in FIGS. 2-4) of housing 16 removed to show the sliding storage tray 40 disposed within the storage cavity 30 of the storage presenter 10. As shown in FIG. 5A, the storage tray 40 further comprises a rear wall 47, which helps to retain items stored in the storage tray 40. The storage presenter 10 further comprises a flexible connector or sliding track 50 which is operably coupled to the door 12 and the storage tray 40 and is disposed within the housing 16. In the embodiment shown in FIG. 5A, the flexible connector 50 is disposed between the housing 16 on the storage presenter's top wall 18 and an interior guide 52 which retains the flexible connector 50 in a guide channel 54 disposed between the interior guide 52 and the top wall 18. In the embodiment shown in FIG. 5A, the interior guide 52 has a similar U-shaped configuration as exterior housing 16, such that the height and width of the guide channel 54 is relatively consistent. As shown in FIG. 5A, the storage tray 40 is in a recessed or stowed position D within the storage cavity 30.

Figure 5B:
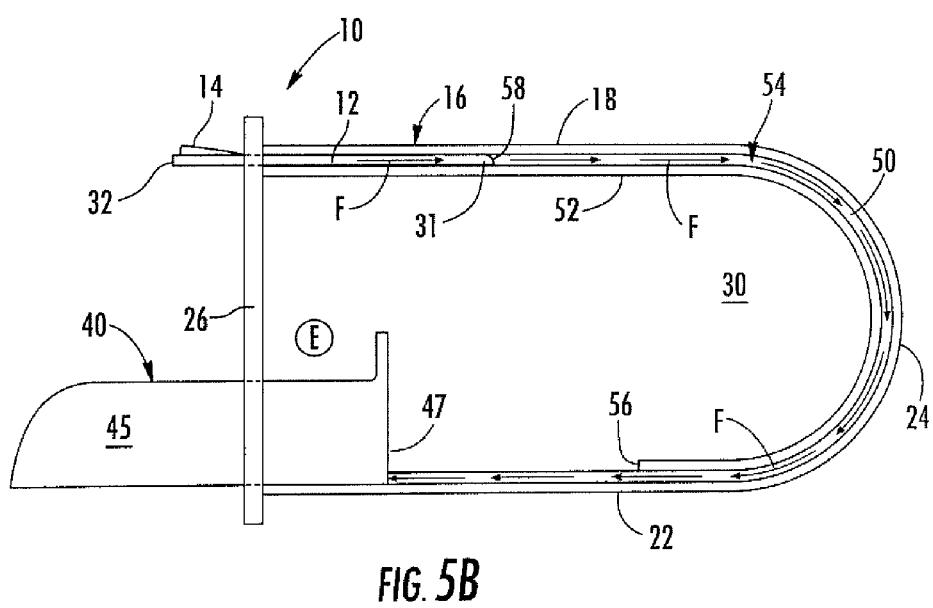
FIG. 5B is a side elevational view of the storage presenter in an open position, illustrating relative movement of the storage presenter.

Turning now to FIG. 5B, the access door 12 is shown in a stowed or recessed position as having been slideably pushed into the guide channel 54 of the housing 16 by the user in a path indicated by arrows F. As the door 12 is slideably recessed into the guide channel 54 of the housing 16, the flexible connector 50 is also moved within the guide channel 54, thereby urging the storage tray 40 into a deployed position E. Thus, when in the deployed position, the storage tray 40 presents items stored therein to the user. When the user wishes to retract the storage tray 40 into the storage cavity 30 of the storage presenter 10, the user may engage the lower portion 32 of the access door 12 and pull the access door 12 out to the deployed position shown in FIG. 5A. As the access door 12 is pulled out to a deployed position, the flexible connector 50 will pull the storage tray 40 into the storage cavity 30 until the storage tray 40 hits a guide stop 56 disposed at the end of the interior guide 52. Alternately, the user may push the storage tray 40 into the housing 16, thereby sliding the door 12 from the housing 16 to the deployed position, as shown in FIG. 5A from which the door 12 can pivot and close the storage presenter 10.

Figure 6A:
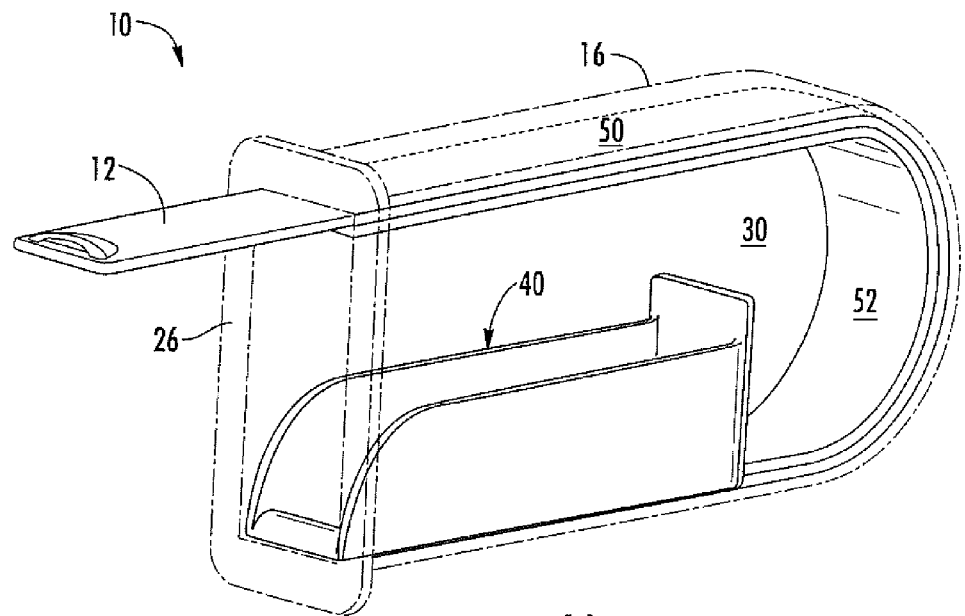
FIG. 6A is a perspective view of the storage presenter in an open position.
Figure 6B:
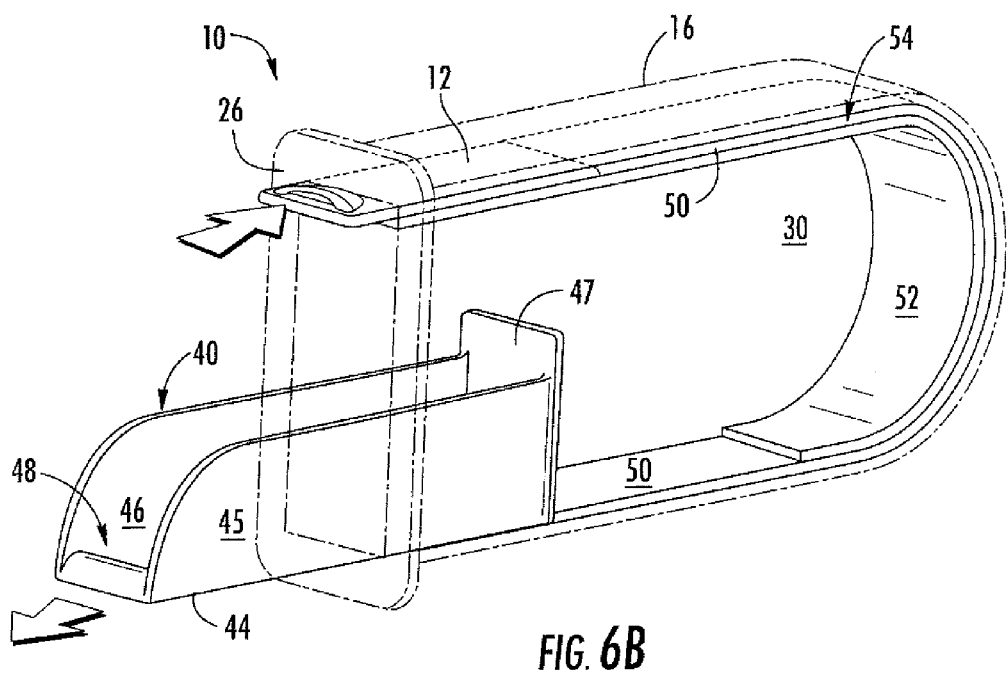
FIG. 6B is a perspective view of the storage presenter in an open position, illustrating relative movement of the storage presenter.

As shown in FIG. 5B, the upper portion 31 of the access door 12 is coupled to the sliding track 50 at a junction wherein a living hinge 58 is disposed. In this way, the access door 12 is pivotable relative to the housing 16 at the site of the living hinge 58 when the door 12 is in the deployed or extended position. The elevated tab or finger tab 14 disposed on the lower portion 32 of the access door 12 serves as a door stop, which assures that the door 12 is not fully recessed into the guide channel 54, such that the lower portion 32 of access door 12 is accessible to the user to pull the access door 12 from the housing 16, stow the storage tray 40 and close the storage presenter 10. In the embodiment shown in FIGS. 6A and 6B, the deployment of the storage tray 40 is again illustrated by the actuation of the access door 12. In this way, the storage tray 40 presents to the user items stored within the storage cavity 48 of the storage tray 40. In FIGS. 6A and 6B, the housing 16 is shown in phantom.

Figure 7:
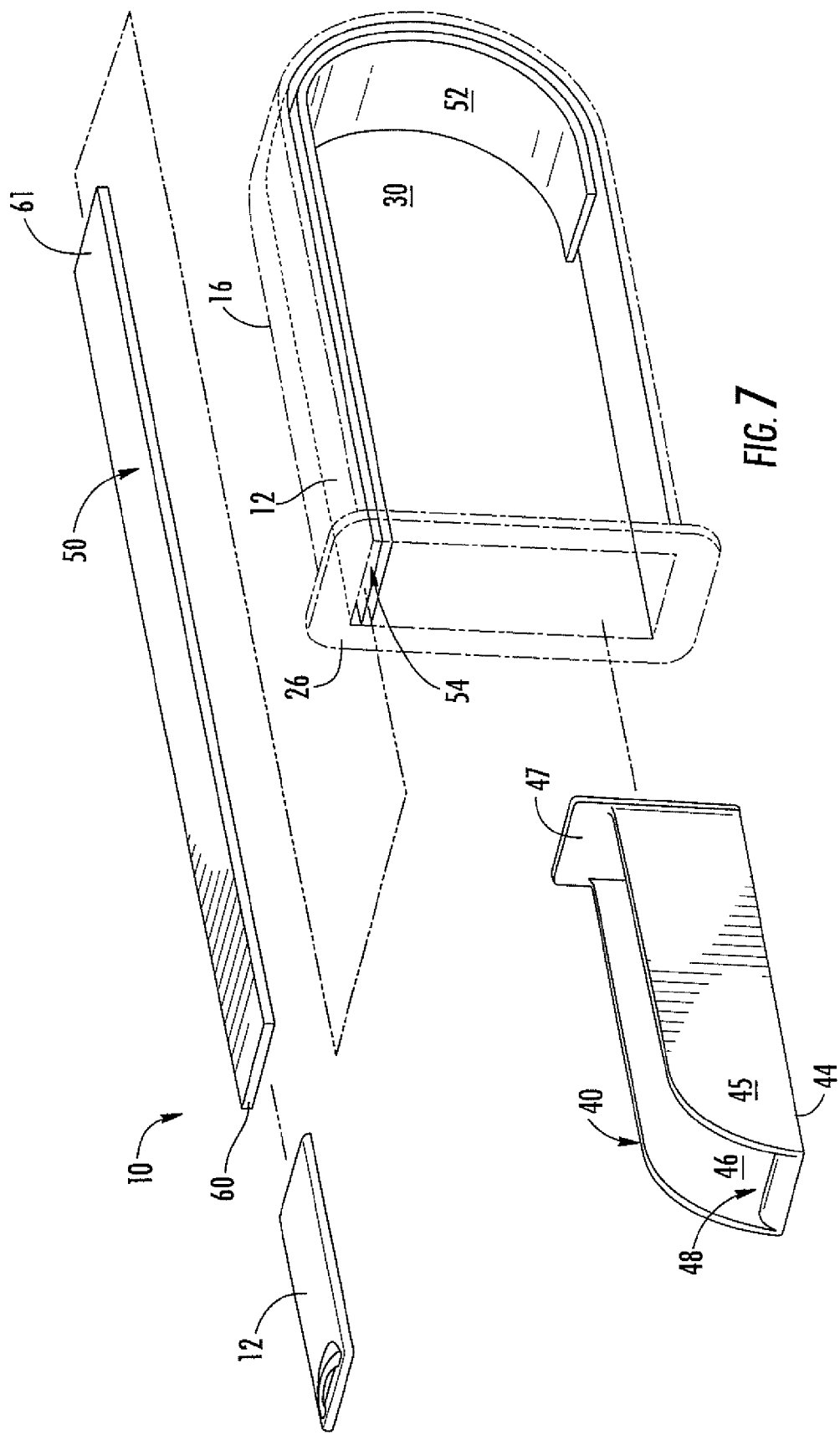
FIG. 7 is an exploded perspective view of a storage presenter.

Referring now to FIG. 7, the storage presenter 10 is shown in an exploded view with the housing 16 in phantom. Flexible connector 50 is shown having a first end 60 and a second end 61. The flexible connector 50 is sized to fit within the guide channel 54 formed by the interior guide 52 and the housing 16. The flexible connector 50 is comprised of a flexible material that allows the flexible connector 50 to conform to the U-shaped configuration of the storage presenter 10. The flexible connector 50, while flexible, retains enough rigidity to move the storage tray 40 to a deployed position when the access door 12 is recessed into the housing guide channel 54 without deformation of the flexible connector 50. The flexible connector 50 maybe comprised of a polymeric material which allows it to retain sufficient rigidity to move with the access door 12 and storage tray 40, yet conform to the overall U-shaped configuration of the storage presenter 10.

Figure 8:
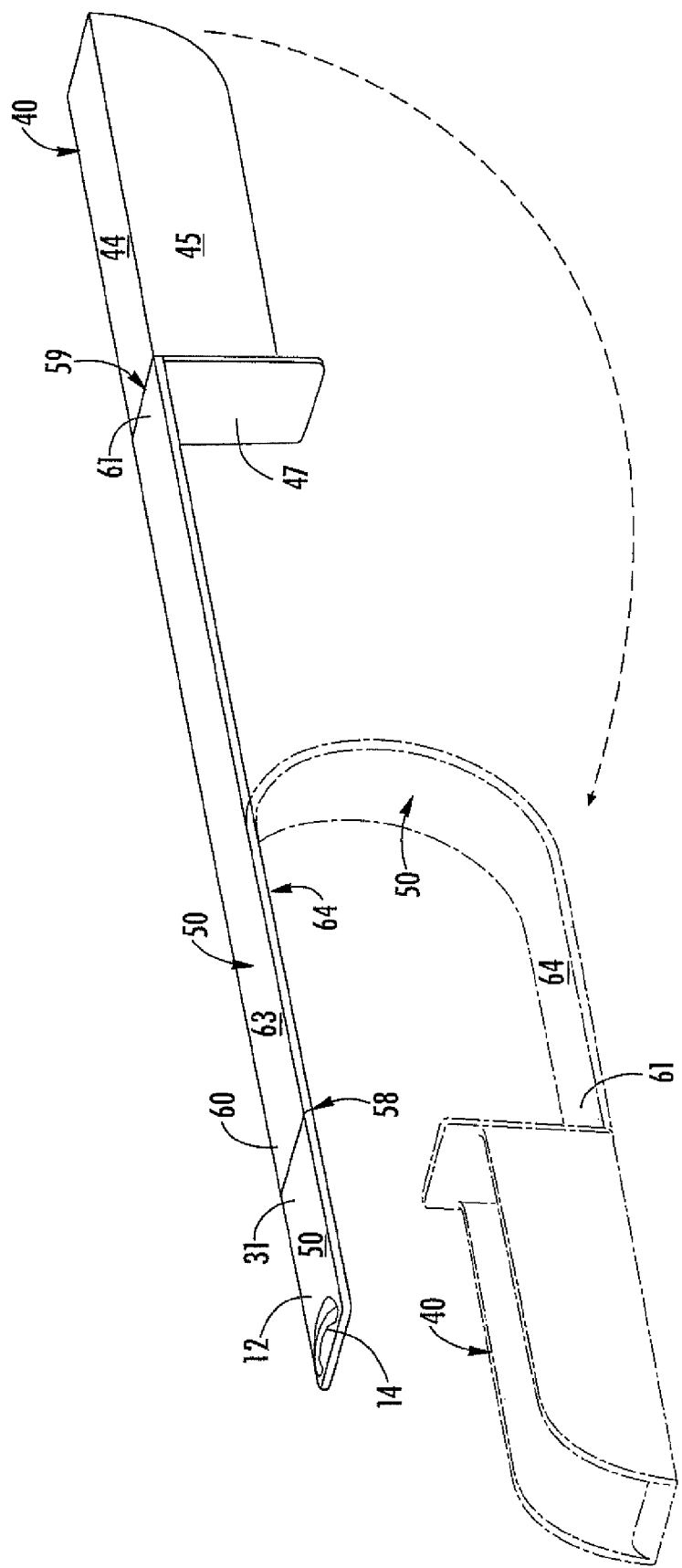
FIG. 8 is a perspective view of a door, flexible connector, and tray assembly of the present invention.

As shown in FIG. 8, the flexible connector 50 has a first side 63, a second side 64 and first and second ends 60, 61. The flexible connector 50 is operably coupled to the upper portion 31 of the access door 12 at first end 60. At the junction of the access door 12 and the flexible connector 50, a living hinge 58 is disposed which allows the access door 12 to be pivotable in relation to the housing in assembly. Second end 61 of the flexible connector 50 is operably coupled to the storage tray 40 at or near the intersection of rear wall 47 and the bottom wall 44 of the storage tray 40. The second end 61 of the flexible connector 50 connects to the storage tray 40 at junction point 59. It is contemplated that the access door 12, the flexible connector 50 and the storage tray 40 can all be comprised of a unitary polymeric member. Also, it is contemplated that the flexible connector 50 can be attached to the storage tray 40 at junction point 59 in a manner such that the storage tray 40 is removable from the flexible connector 50 for ease of assembly of the storage presenter as well as to allow for removing and cleaning of the storage tray 40.

As further shown in FIG. 8, the flexible connector 50 can flex to correlate to the U-shaped configuration of the storage presenter housing 16 (as shown in FIGS. 2-4), such that first end 60 of the flexible connector 50 is disposed in a generally vertically spaced-apart relationship above second end 61 of the flexible connector 50 in assembly. In this way, the body portion of the flexible connector 50, disposed between first end 60 and second end 61, forms the U-shaped portion of the flexible connector 50 for use in the storage presenter 10 of the present invention. The flexible connector 50 is slideably engaged with respect to the housing in such a way that the access door 12 and the storage tray 14 are inversely slideable between stowed and deployed positions relative to the housing. Thus, the access door 12 actuates the deployment of the storage tray 40 to a deployed position when the access door 12 is pushed by the user to a stowed position within the housing 16, as shown in FIG. 6B. Inversely, as the storage tray is moved to a stowed position as shown in FIG. 6A, the access door 12 slideably moves relative to the housing 16 to a deployed position where the access door 12 is pivotable in relation to the housing 16 to open and close the storage presenter 10. With the storage tray 40 and the access door 12 being slideably movable relative to the housing 16 in an inverse relationship, the stowing of either the access door 12 or storage tray 40 actuates the deployment of the other and vice versa.

In the embodiment shown in FIGS. 5A and 5B, the flexible connector 50 is an elongate flexible connector which resides in a guide channel 54 disposed within the housing 16. It is further contemplated that the flexible connector 50 can reside within the housing 16 of the storage presenter 10 without an interior guide 52 or guide channel 54. In such a configuration, a support guide would be disposed near the lip or rim 26 of the housing 16 to positively capture the door 12 and flexible connector 50 near the top wall 18 of the housing 16. Similarly, a guide would also be installed near the location of the guide stop 56, as shown in FIG. 5B, to positively retain the flexible connector 50 against the bottom wall 22 of the housing 16. This guide insert would also serve as an abutment for the storage tray 40 when the storage tray 40 is in the stowed position D, as shown in FIG. 5A. Thus, it is contemplated that the flexible connector 50 retains a certain amount of rigidity, such that it will conform to the U-shaped configuration of the storage presenter 10 even when a fully encapsulating interior guide channel is not present.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle panel storage presenter comprising:
    a flexible connector slideably movable relative to a housing and having a first end and a second end;
    a door operably coupled to the connector at the first end, and pivotably moveable between open and closed positions;
    a storage tray operably coupled to the connector at the second end; and
    wherein the storage tray and the door are slideably moveable relative to the housing in an inverse manner.

2. A vehicle panel storage presenter as set forth in claim 1, wherein:
    the housing includes a top wall, a bottom wall, side walls and a curved rear wall such that the housing forms a substantially U-shaped storage cavity.

3. A vehicle panel storage presenter as set forth in claim 2, wherein:
    the housing further includes an interior guide defining a guide channel with the top wall, bottom wall, side walls and curved rear wall of the housing.

4. A vehicle panel storage presenter comprising:
    a flexible connector slideably movable relative to a housing and having a first end and a second end, the housing including a top wall, a bottom wall, side walls and a curved rear wall such that the housing forms a substantially U-shaped storage cavity;
    an interior guide defining a guide channel with the top wall, bottom wall, side walls and curved rear wall of the housing;
    a door operably coupled to the connector at the first end;
    a storage tray operably coupled to the connector at the second end; and
    wherein the storage tray and the door are slideably moveable relative to the housing in an inverse manner, and further wherein the flexible connector is disposed within the guide channel such that first end is disposed in a vertical spaced-apart relationship above the second end.

5. A vehicle panel storage presenter as set forth in claim 4, wherein:
    the door is operable between a deployed position and a stowed position relative to the housing such that the door is substantially enclosed within the housing when in the stowed position.

6. A vehicle panel storage presenter comprising:
    a flexible connector slideably movable relative to a housing and having a first end and a second end;
    a door operably coupled to the connector at the first end;
    a storage tray operably coupled to the connector at the second end; and
    wherein the storage tray and the door are slideably moveable relative to the housing in an inverse manner, and further wherein the door is operable between a deployed position and a stowed position relative to the housing such that the door is substantially enclosed within the housing when in the stowed position, the door being pivotably moveable relative to the housing when the door is in the deployed position.

7. A vehicle panel storage presenter as set forth in claim 6, wherein:
    the tray is operable between a deployed position and a stowed position relative to the housing such that the tray is substantially enclosed within the housing when in the stowed position.

8. A vehicle panel storage presenter as set forth in claim 7, wherein:
    the tray actuates the deployment of the door to the deployed position as the tray is stowed.

9. A vehicle panel storage presenter as set forth in claim 8, wherein:
    the door actuates the deployment of the tray to the deployed position as the door is stowed.

* * * * *